(12) United States Patent
Hanagan

(10) Patent No.: US 7,290,832 B2
(45) Date of Patent: Nov. 6, 2007

(54) MOTORCYCLE BACKREST AND GLOVE BOX ASSEMBLY

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 51 days.

(21) Appl. No.: 11/263,185

(22) Filed: Oct. 31, 2005

(65) Prior Publication Data

US 2007/0096512 A1 May 3, 2007

(51) Int. Cl.
*B62J 1/00* (2006.01)
*A47C 7/62* (2006.01)

(52) U.S. Cl. .................. 297/188.07; 297/188.01; 297/188.04; 297/215.11; 297/215.12

(58) Field of Classification Search ........... 297/188.01, 297/188.04, 188.07, 215.1, 215.11, 215.12
See application file for complete search history.

(56) References Cited

U.S. PATENT DOCUMENTS

| | | | |
|---|---|---|---|
| 4,266,703 A | 5/1981 | Litz | |
| 4,311,205 A * | 1/1982 | Goodacre et al. | ... 297/188.07 X |
| D276,712 S | 12/1984 | Kashio et al. | |
| D287,237 S | 12/1986 | Abe | |
| 4,690,237 A | 9/1987 | Funabashi et al. | |
| RE33,178 E * | 3/1990 | Ahlberg | ............. 297/215.11 X |
| 5,743,452 A | 4/1998 | Liu | |
| 6,390,220 B1* | 5/2002 | Galbraith et al. | .... 297/215.1 X |
| 6,491,124 B1* | 12/2002 | Thompson et al. | . 297/215.12 X |
| 6,655,740 B1 | 12/2003 | Hanagan | |
| 6,729,516 B2 | 5/2004 | Hanagan | |
| 6,848,156 B2 | 2/2005 | Hanagan et al. | |
| 6,971,714 B1* | 12/2005 | Hanagan | ................ 297/215.12 |
| 7,008,014 B1* | 3/2006 | Johnson et al. | ......... 297/215.12 |
| 7,147,281 B2* | 12/2006 | Michisaka et al. | ..... 297/215.12 |
| 2002/0121534 A1 | 9/2002 | Hanagan | |
| 2003/0173386 A1 | 9/2003 | Scaccia | |
| 2004/0098853 A1 | 5/2004 | Hanagan et al. | |
| 2005/0098369 A1 | 5/2005 | Augustine, Jr. | |
| 2005/0161482 A1 | 7/2005 | Krohn | |

FOREIGN PATENT DOCUMENTS

GB    2076754 A    * 12/1981

* cited by examiner

*Primary Examiner*—Rodney B. White

(57) ABSTRACT

A motorcycle seatback and glove box assembly includes a mounting post having a lower end portion adapted to seat in a receptacle in a motorcycle seatback cushion member mounted on the upper end portion of the mounting post. The cushion member has a frame, cushioning material extending about the front and sides of the frame, and a flexible cover disposed over the cushioning material. A glove box is secured to the rear of the frame of the cushion member and includes a receptacle having an opening thereinto, a cover configured and dimensioned to cover the opening, and a hinge pivotally mounting the cover on the receptacle. Fasteners secure the receptacle to the frame of the backrest cushion.

8 Claims, 6 Drawing Sheets

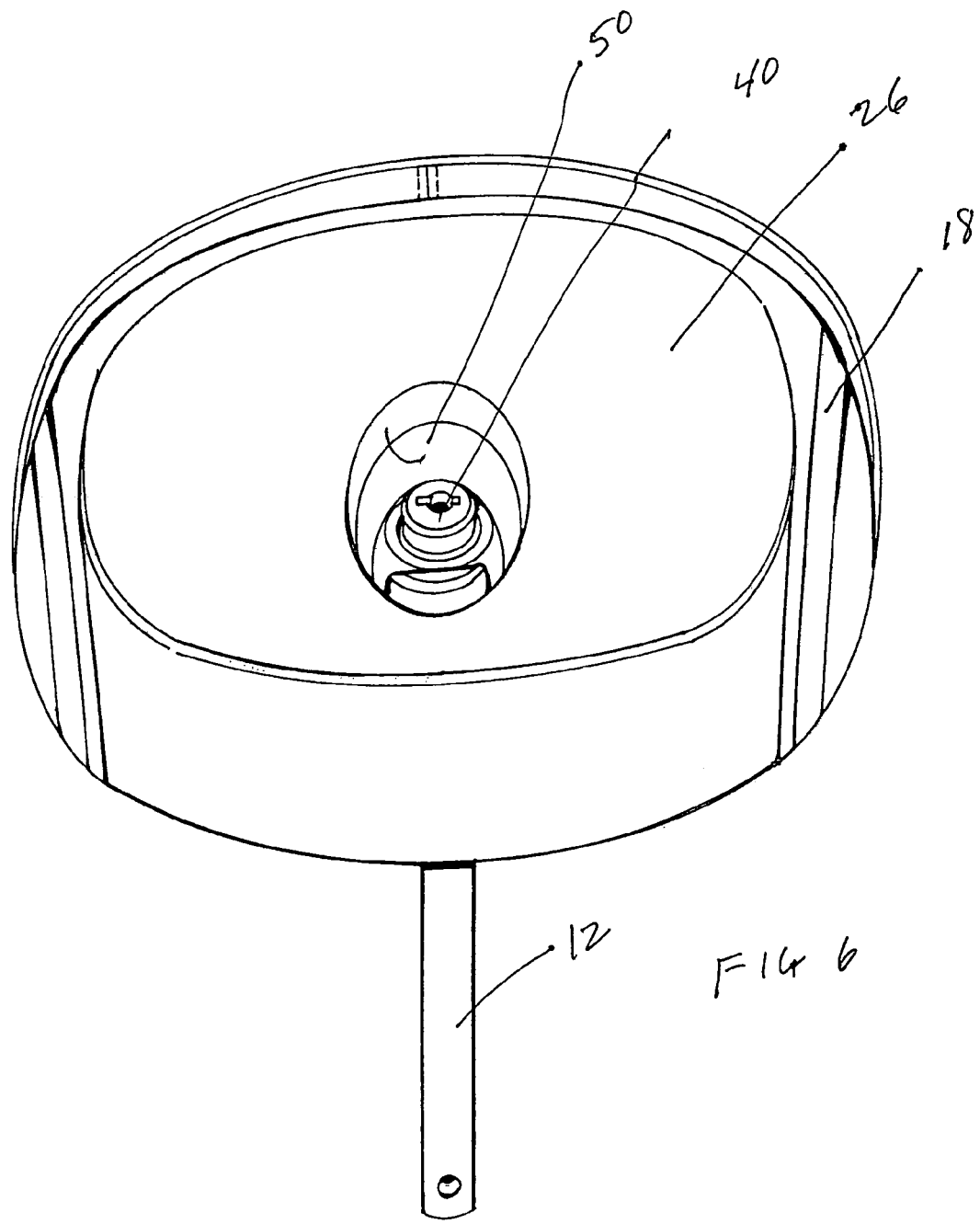

MOTORCYCLE BACKREST AND GLOVE BOX ASSEMBLY

BACKGROUND OF THE INVENTION

The present invention relates to motorcycle backrests, and, more particularly, to motorcycles with backrests and having a glove box or like storage container.

Many motorcycle saddles include backrests which may or may not be permanently mounted on the saddle or the frame, and these may be for the comfort of the driver or passenger, and, in some instances, a tandem motorcycle seat may provide each with a suitable backrest. Illustrative of a desirable backrest construction is Applicant's U.S. Pat. No. 6,655,740 granted Dec. 2, 2003.

Many motorcyclists desire to have some form of storage area on the motorcycle in which to keep sunglasses, gloves and other small articles. Still others desire large storage containers and saddle bags which are supported on the motorcycle chassis, and these may or may not be readily removable. Such structures affect the aerodynamics of the motorcycle, and it is desirable to minimize the adverse effects on such aerodynamics.

Accordingly, it is an object of the present invention to provide a novel assembly of a backrest and glove box for the storage of small articles.

It is also an object to provide such an assembly in which the glove box is mounted upon the motorcycle backrest in a position to minimize adverse effects upon the aerodynamics of the motorcycle.

Another object is to provide such an assembly which can be readily and economically fabricated and which is durable and secure.

A further object is to provide such a glove box which can be readily mounted on the backrest or removed therefrom

SUMMARY OF THE INVENTION

It has now been found that the foregoing and related objects may be readily attained in a motorcycle seatback and glove box assembly comprised of a seatback with a mounting post having a lower end portion adapted to seat in a receptacle in a motorcycle saddle behind the driver's seat. A backrest member cushion is mounted on the upper end portion of the mounting post and includes a frame, cushioning material extending about the front and sides of the frame, and a flexible cover disposed over the cushioning material.

A glove box is secured to the rear of the frame of the cushion member and includes a receptacle having an opening thereinto, a cover configured and dimensioned to cover the opening, and means pivotally mounting the cover on the receptacle.

Fasteners secure the receptacle to the frame of the backrest cushion, and cooperating lock elements on the cover and the receptacle lock the cover over the opening.

Preferably, the container portion and cover are molded from synthetic resin, and the receptacle has a front face dimensioned and configured cooperatively with respect to the rear surface of the seat back cushion to fit snugly together. The fasteners are seated in apertures in the front wall of the container and are accessible through the opening.

The cover is hinged to the upper front of the receptacle which has curvilinear contours and tapers rearwardly to a reduced cross section. The cover has a grip thereon to facilitate opening the cover, and the receptacle and cover have overlapping portions extending about the opening.

Desirably, gasket material is provided between the overlapping surfaces of the cover and receptacle.

BRIEF DESCRIPTION OF THE DRAWINGS

FIG. 6 is a rear view of the assembly with the cover closed.

DETAILED DESCRIPTION OF THE ILLUSTRATED EMBODIMENT

Figure 1:
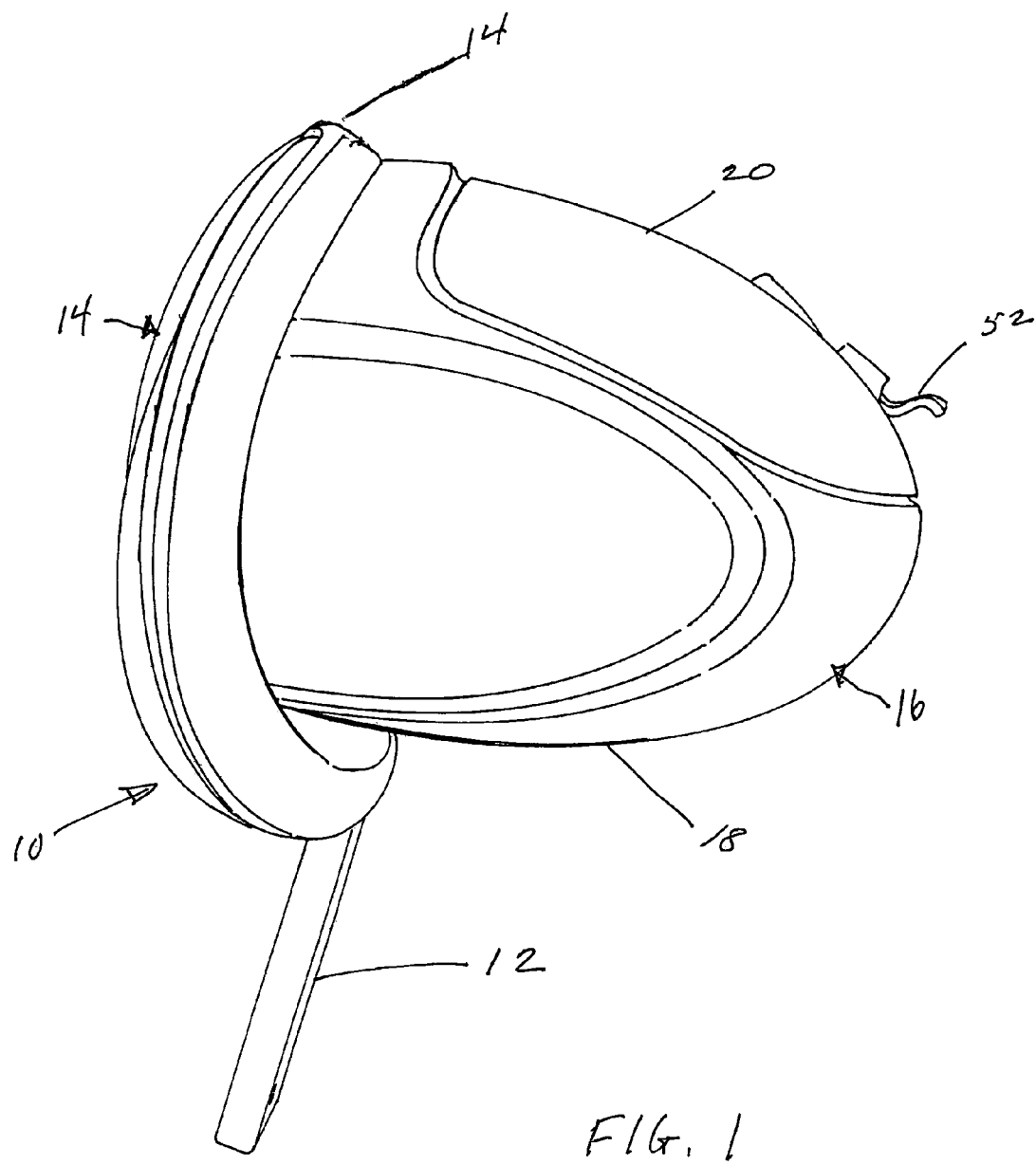
FIG. 1 is a side elevational view of a motorcycle backrest and glove box assembly embodying the present invention.

In FIG. 1 there is illustrated a motorcycle seatback and glove box assembly embodying the present invention. At the left side of the figure is the seatback generally designated by the numeral 10 with a post 12 and a cushion member generally designated by the numeral 14. Attached to the rear of the cushion member 14 is the glove box generally designated by the numeral 16, and it includes a compartment member 18 and cover 20.

Figure 2:
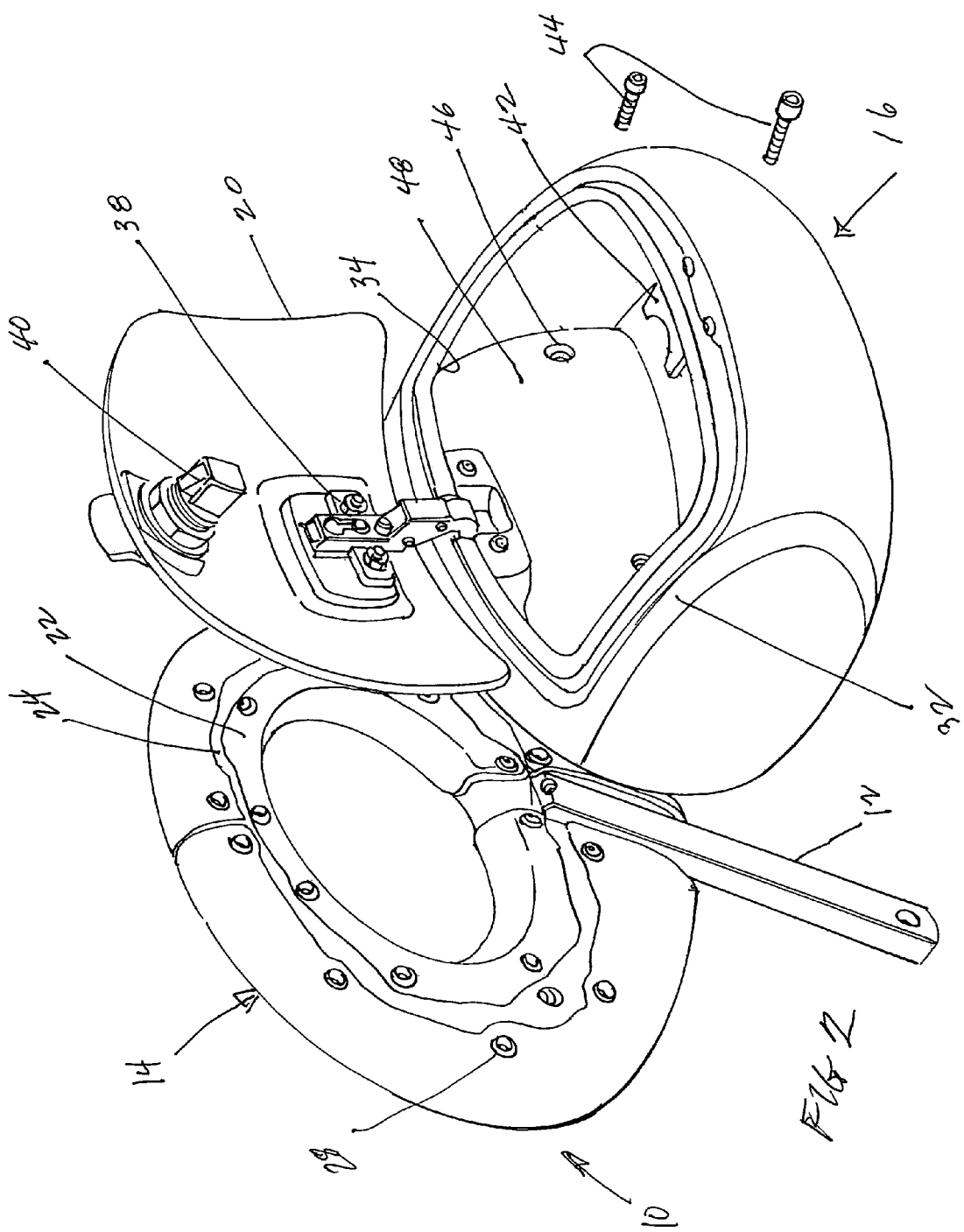
FIG. 2 is a partially exploded view of the backrest and glove box assembly of FIG. 1.
Figure 3:
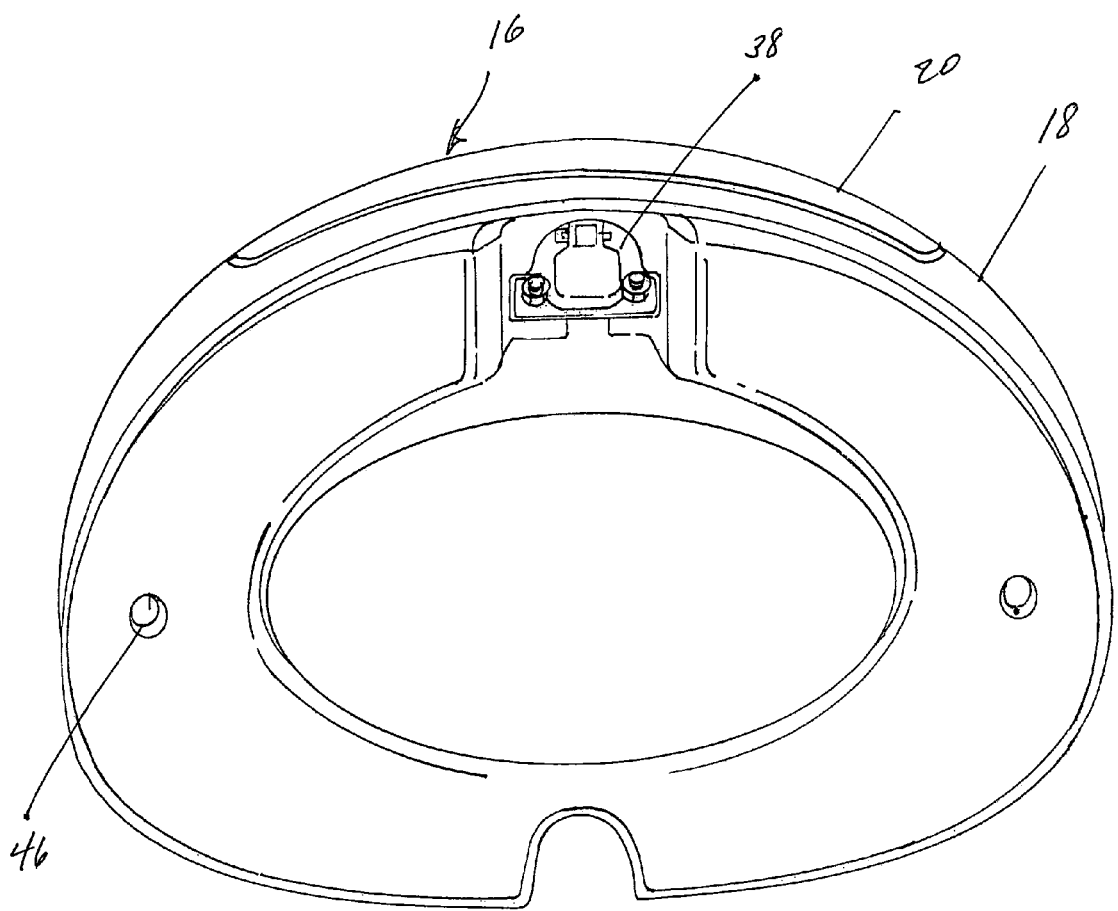
FIG. 3 is a front view of the glove box of FIG. 1 prior to assembly on the backrest.

Turning next to FIG. 2, the seatback 10 has a frame 22, cushioning material 24 disposed on the front and sides thereof, and a cover 26 disposed thereover and secured to the frame 22 by rivets 28. The post 12 and frame 22 are firmly engaged by a fastener 30 about which the cushion member 14 can pivot. A preferred structural assembly for the seatback 10 is illustrated and described in Applicant's U.S. Pat. No. 6,655,740.

The receptacle 18 of the glove box 16 has a top wall 32 with a large opening 34 therein, and the cover 26 is dimensioned and configured to close the opening 34. Gasket material 36 is provided between the overlying surfaces to provide a weather-tight seal thereabout.

The cover 20 is supported at its front end upon a hinge 38 so that it can be readily pivoted into the open position seen in FIG. 2 or the closed position seen in FIG. 1. A key lock 40 is mounted on the rear end of the cover 20 and engages with the cooperating catch 42 on the receptacle 38 to enable locking of the cover 20 in the closed position.

The glove box 16 is secured to the frame 22 of the cushion member 14 by a pair of threaded fasteners 44 which seat in apertures 46 formed in the front wall 48 of the receptacle 18 and threadably engage in a pair of threaded nuts (not shown) on the frame 22 of the cushion member 14 so that the glove box 16 may be readily mounted (or dismounted from) the seatback 10 only when the cover 20 is open.

Figure 5:
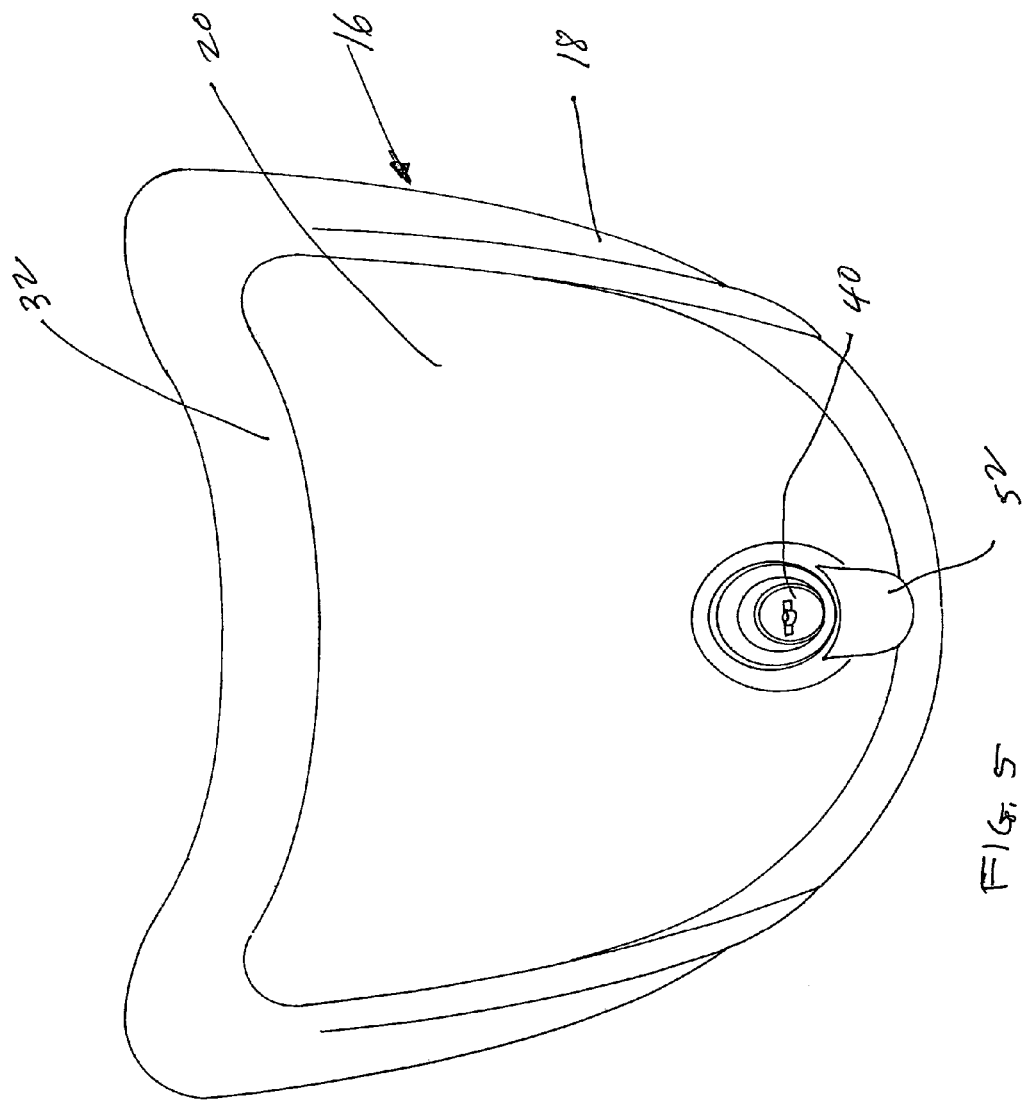
FIG. 5 is a top view of the glove box.

As seen in FIGS. 5 and 6, the key lock 40 is disposed in a recess 50 formed in the cover, and a pull grip 52 is conveniently included.

Figure 4:
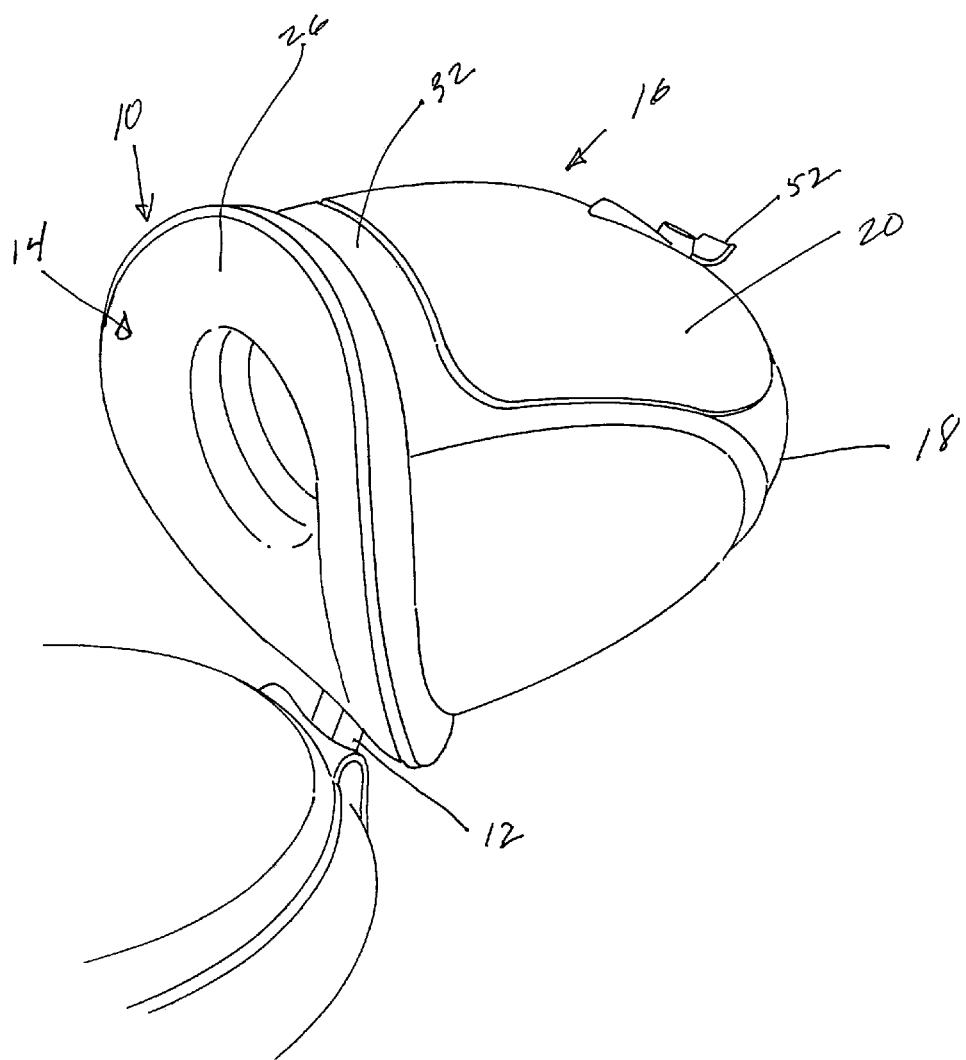
FIG. 4 is a perspective view of the assembly as installed on a fragmentarily illustrated saddle.

In FIG. 4, the seatback/glove box assembly is shown as mounted at the rear end of a saddle generally designated by the numeral 54. When mounted on a tandem saddle the seatback/glove box assembly of the present invention may be mounted behind the passenger position of the saddle, or it may be mounted behind the driver or the passenger. Two seatbacks may be employed with tandem saddles.

As best seen in FIG. 1, the glove box seats tightly against the rear of the cushion member and blends into its contours.

Moreover, the glove box has curvilinear surfaces which taper to a reduced cross section at its rear end to provide desirable aerodynamic flow.

Applicant's U.S. Pat. No. 6,655,740 discloses a motorcycle backrest which is readily adapted to the assembly of the present invention. On the rear surface of that backrest is a finishing plate which is secured to the frame of the cushion member. For the present invention, that finishing plate can be removed and replaced with the glove box to produce the assembly of the present invention. However, if the driver does not require a glove box, he or she can remove the glove box and replace it with a finishing plate.

The glove boxes utilized in the present invention may be easily molded from various synthetic resins providing durability and impact resistance such as ABS resins. The gasketing can be a closed cell foam or a resiliently deformable material such as synthetic rubbers.

It will be readily seen from the attached drawings and preceding description that the glove box may be easily mounted and readily removed by opening the cover to the glove box and thereby exposing the fasteners which secure the glove box or finishing plate, as the case may be, to the frame of the cushion member of the backrest. Locating the glove box on the back of the seatback obviously minimizes the surface area on which air flow will impinge and thereby minimizes adverse effects upon the aerodynamic characteristics of the motorcycle.

Lastly, the glove box may have varying contours and obviously vary in the amount of interior space available for storage. The illustrated glove box presents a desirable aesthetic appearance while maintaining good aerodynamic characteristics.

Thus, it can be seen that the seatback/glove box assembly of the present invention is one which can be readily fabricated and assembled, which is attractive in appearance and which provides relative security for the items stored therein.

Having thus described the invention, what is claimed is:

1. A motorcycle seatback and glove box assembly comprising:
   (a) a mounting post extending upwardly from and having a lower end portion adapted to seat in a receptacle in a motorcycle saddle;
   (b) a seatback cushion member mounted on an upper end portion of said mounting post, said cushion member including;
      i) a frame having a front, a rear, left and right sides;
      ii) cushioning material extending about the front and sides of said frame; and
      iii) a flexible cover disposed over said cushioning material;
   (c) a glove box secured to the rear of said frame of said cushion member and including:
      i) a receptacle having an opening thereinto, said receptacle having a front wall;
      ii) a cover configured and dimensioned to cover said opening; and
      iii) means pivotally mounting said cover on said receptacle; and
   d) fasteners securing said front wall of said receptacle to said seatback frame of said seatback cushion member and accessible through said opening to remove or fasten said glove box to said cushion member; and
   including cooperating lock elements on said cover and said receptacle to lock said cover over said opening.

2. The motorcycle seatback and glove box assembly In accordance with claim 1 wherein said receptacle and cover arc molded synthetic resin.

3. The motorcycle seatback and glove box assembly in accordance with claim 1 wherein said receptacle has a front face dimensioned and configured cooperatively with respect to the a rear surface of said seatback cushion member to fit snugly together.

4. The motorcycle seatback and glove box assembly in accordance with claim 1 wherein said cover is hinged to an upper front of said receptacle.

5. The motorcycle seatback and glove box assembly in accordance with claim 1 wherein said receptacle has curvilinear contours and tapers rearwardly to a reduced cross section.

6. The motorcycle seatback and glove box assembly in accordance with claim 1 wherein said glove box cover has a grip member thereon to facilitate opening said cover.

7. The motorcycle seatback and glove box assembly in accordance with claim 1 wherein said receptacle and cover have overlapping portions extending about said opening.

8. The motorcycle seatback and glove box assembly in accordance with claim 7 wherein gasket material is provided between overlapping surfaces of said cover and receptacle.

* * * * *